Patented Sept. 7, 1943

2,329,086

UNITED STATES PATENT OFFICE 2,329,086

SULPHONATED AMIDES AND PROCESS OF PRODUCING SAME

Edwin A. Robinson, Chatham, N. J., and Thomas G. Webber, Jr., Cambridge, Mass., assignors to National Oil Products Company, Harrison, N. J., a corporation of New Jersey No Drawing. Application May 20, 1939, Serial No. 274,754

10 Claims. (Cl. 260—401)

This invention relates to sulphonated amides and sulphonated amine soaps of higher fatty acids, more particularly to substantially anhydrous and inorganic salt-free sulphonated amides and sulphonated amine soaps of higher fatty acids.

It is well known that sulphonated amides or sulphonated amine soaps of higher fatty acids may be prepared by sulphonating an oil, fat, fatty acid or fatty ester and then reacting the sulphonated product with an amine. The sulphonation step is ordinarily carried out by treating the organic material to be sulphonated with a sulphonating agent such as sulphuric acid, washing the sulphonation mass when the reaction has proceeded to the desired stage with an aqueous salt solution to remove most of the residual sulphonating agent, neutralizing the remainder of the sulphonating agent with an aqueous alkaline solution, and then permitting the aqueous salt solution to settle out of the sulphonated mass. Because of the strong emulsifying properties and water solubility of the sulphonated mass, substantial amounts of water and inorganic salts inevitably remain in the final product; it is not practical to attempt to remove these substances by further washing, since a considerable amount of sulphonated material would thereby be lost and hydrolytic decomposition products would be formed. Therefore, sulphonated oils, fats, fatty acids and fatty esters prepared in the ordinary manner contain between about 10% and 30% water and appreciable amounts of inorganic salts. When these sulphonated products are reacted with amines, the sulphonated amides and sulphonated amine soaps thus obtained also contain considerable amounts of water and inorganic salts.

The presence of water and inorganic salts in the sulphonated amides and sulphonated amine soaps is undesirable and detrimental for various reasons. In the first place, the high water and salt contents of such products greatly reduce their range of application and add to the difficulty of compounding them with unsulphonated oils or other substances for industrial uses. The presence of inorganic salts reduces the stability of emulsions containing the sulphonated amides or amine soaps and is often detrimental to materials such as textiles which may be treated with such emulsions. Furthermore, the presence of the inorganic salts catalyzes hydrolysis and oxidation of the amides and amine soaps, thereby considerably reducing the usefulness of these products.

We have also found that the presence of water and inorganic salts in sulphonated material reacted with amines to form amides or amine soaps causes the formation of products of much lower $SO_3$ content than would be expected from the $SO_3$ content of the sulphonated material; the relatively low $SO_3$ content of the amides and amine soaps thus prepared is highly undesirable, since the solubility and dispersibility of these products are thereby considerably reduced.

Another method of preparing sulphonated amides of higher fatty acids involves reacting an oil, fat, fatty acid or fatty ester with an amine and then sulphonating the amide thus obtained. It is evident, however, that the sulphonated amides produced by this method also contain considerable amounts of water and inorganic salts inasmuch as the sulphonation step is carried out in a manner similar to that hereinabove described. Therefore, this method is not capable of producing substantially anhydrous and salt-free sulphonated amides of higher fatty acids.

Sulphonated amides of higher fatty acids may also be prepared by reaction of sulphonated oils, fats, fatty acids and fatty esters with an amide; or the oils, fats, fatty acids and fatty esters may first be reacted with an amide and the product then sulphonated. However, these processes also yield sulphonated amides containing relatively large amounts of water and inorganic salts.

From the above discussion it will appear that substantially anhydrous and salt-free sulphonated amides and amine soaps of higher fatty acids could advantageously be employed for a variety of purposes. To our knowledge, however, such products have not successfully been produced.

It is the object of this invention to provide a process for the preparation of substantially anhydrous and salt-free sulphonated amides and sulphonated amine soaps of higher fatty acids.

It is a further object of this invention to provide improved lubricants and softeners for textile materials.

According to our invention, substantially anhydrous and salt-free products selected from the group consisting of sulphonated amides and sulphonated amine soaps of higher fatty acids are prepared by reacting a compound selected from the group consisting of organic amines and amides with substantially anhydrous and inorganic salt-free sulphonated materials selected from the group consisting of sulphonated oils, sulphonated fats, sulphonated higher fatty acids and sulphonated higher fatty esters. We prefer to employ in the practice of our invention sulphonated oils, fats, fatty acids or fatty esters containing not more than about 3% water, and not more than about 0.2% inorganic salts. Such sulphonated materials may be prepared as described in the copending applications of Steik, Serial No. 77,761, and Steik and Kapp, Serial No. 160,270, by sulphonating an oil, fat, fatty acid or fatty ester in the usual manner and then taking up the crude sulphonation mass in an anhydrous solvent selected from the group consisting of alcohols, hydrocarbons, chlorinated hydrocarbons, ethers, ketones, or mixtures of such solvents; the solution of the sulphonation mass is then treated with a solution of a base, the salts thus formed and the unreacted sulphonating agent separated, and the solvent and water distilled from the sulphonation product. Such anhydrous sulphonated materials may also be prepared as described in the copending application of Kapp et al., Serial No. 197,858, now Patent No. 2,285,337, issued June 2, 1942 by treating an oil, fat, fatty acid or fatty ester with a sulphonating agent, subjecting the sulphonation mass to the usual steps of washing, neutralizing, panning, etc., then dehydrating the mass at a relatively low temperature and at a reduced pressure, taking up the partially dehydrated product in an anhydrous organic solvent, whereby the inorganic salts are precipitated, and then distilling the salt-free material to remove the solvent and water.

We have found sulphonated amides and amine soaps prepared in accordance with our invention are substantially anhydrous and contain practically no inorganic salts. The water and inorganic salt contents of our products are in no case greater than those of the substantially anhydrous and inorganic salt-free sulphonated materials employed as the starting material in accordance with our invention, and in some cases the water content of our products may be less than that of the sulphonated material; thus the preferred products of our invention are characterized by a water content not greater than 3% and an inorganic salt content not greater than 0.2%. Our products may be readily compounded with unsulphonated oils. They may be incorporated in emulsions without reducing the stability thereof. They do not tend to hydrolyze or oxidize even after prolonged standing. They have SO$_3$ contents only slightly lower than those of the sulphonated materials from which they are prepared; this factor is extremely advantageous since the solubility and dispersibility of the sulphonated amides and amine soaps are thereby greatly enhanced. The products of our invention are particularly adapted for use as softeners for textile materials, since in this connection results are achieved which represent substantial improvements over those results attained with ordinary sulphonated amides and amine soaps which contain substantial amounts of water and inorganic salts.

The sulphonated oils, fats, fatty acids or fatty esters employed as starting materials in accordance with our invention may be any of the substantially anhydrous and inorganic salt-free sulphonated oils, fats, fatty acids or fatty esters mentioned in the copending applications hereinabove referred to. These materials preferably should contain not more than about 3% water and not more than about 0.2% inorganic salts. As examples of the substantially anhydrous and inorganic salt-free sulphonated materials which may be used in the practice of our invention, the following may be mentioned: substantially anhydrous and inorganic salt-free sulphonated vegetable oils and fats derived from oils and fats, such as castor oil, corn oil, cottonseed oil, olive oil, palm oil, peanut oil, sunflower oil, rice bran oil, rapeseed oil, teaseed oil, chaulmoogra oil, tomato seed oil, sesame oil, soya bean oil, cocoa butter, Chinese tallow, etc.; substantially anhydrous and inorganic salt-free sulphonated animal oils and fats derived from oils and fats, such as neat's-foot oil, beef tallow, bone fat, horse fat, wool fat, mutton tallow, etc.; substantially anhydrous and inorganic salt-free sulphonated marine oils derived from marine oils, such as cod liver oil, cod oil, herring oil, menhaden oil, porpoise oil, seal oil, salmon oil, sardine oil, shark liver oil, sperm oil, whale oil, tuna body oil, etc.; substantially anhydrous and inorganic salt-free sulphonated fatty acids derived from the above-mentioned oils and fats may be employed. It is also within the purview of the invention to include the treatment of sulphonated products such as sulphonated degraded glycerides of higher fatty acids, sulphonated blown or hydroxylated derivatives of fats or fatty acids, and sulphonated esters of fatty acids other than glycerides.

In accordance with our invention, a substantially anhydrous and inorganic salt-free sulphonated material of the type above-mentioned is reacted with an amine or an amide to produce a substantially anhydrous and inorganic salt-free sulphonated amide or sulphonated amine soap. We prefer to employ amines in the practice of our invention since the reaction goes more smoothly and the yields are higher than is the case when amides are used. Any amine or amide capable of reacting with the sulphonated material may be employed; for example, monoethanolamine, diethanolamine, monopropanol amine, di-propanol amine, hydroxy ethyl ethylene diamine, diethylene triamine, triethylene tetramine, monoamyl amine, octadecyl amine, morpholine, triethanolamine, aniline, acetamide and urea may be used. It should be borne in mind that the type of product obtained depends to some extent upon the particular amine employed. Thus, tertiary amines generally react with the sulphonated materials to give amine soaps, although at elevated temperatures it is sometimes possible to cause tertiary amines to react to form amides. Primary and secondary amines, on the other hand, at first form amine soaps, but these soaps can generally be caused to split out water so as to form amides at temperatures considerably lower than those necessary to form amides in the case of the reaction of tertiary amines. The reaction of the sulphonated material used in accordance with our invention with amides yields sulphonated amides of the higher fatty acids regardless of the type of amide employed.

The reaction of the substantially anhydrous and inorganic salt-free sulphonated materials with the amines or amides is most advantageously carried out by mixing suitable proportions of the reactants in an open vessel and then agitating the reactants until the reaction has progressed to the desired degree; however, any other suitable method of carrying out the reaction may be employed. The proportions of the reactants may vary depending somewhat upon the nature of the sulphonated material used; thus, for example, if a sulphonated fatty acid or sulphonated fatty mono-ester is employed, between about ½ and about 2 mols of the sulphonated material, preferably about 1 mol. per mol of amine or amide may be used; on the other hand, if a sulphonated triglyceride is employed as the starting material, between about 1/6 and about 2/3 mols thereof, preferably about 1/3 mol. per mol of amine or amide may be employed. We prefer to carry out the reaction at atmospheric pressure. However, pressures substantially above or below atmospheric may be employed if desired. The reaction may be carried out in the presence of suitable solvents if desired.

The temperature at which the reaction of the sulphonated materials with amines is carried out is particularly important since the character of the resulting products is dependent thereon. Thus if it desired to obtain amine soaps, the temperature of the reaction may be as low as room temperature (20° C.) although any temperature at which the amine soap does not decompose to give the amide may be employed; this temperature will, as above mentioned, vary with the particular type of amine employed. On the other hand, if it is desired to produce amides, the temperature of the reaction should be somewhat higher than is used for the preparation of amine soaps. When reacting primary or secondary amines with sulphonated materials in accordance with our invention so as to form amides, temperatures between about 100° C. and the boiling point of the amine may be employed, the particular temperature depending upon the amine used. If a tertiary amine is one of the reactants, amides are ordinarily not formed unless the temperature is about 200° C. or above. When employing monoethanolamine to react with a sulphonated material in accordance with our invention, we have found a temperature of about 150° C. is advantageous; other temperatures may be found to be more advantageous in the case of the reaction of amines other than monoethanolamine. If amides are reacted with the sulphonated material in accordance with our invention, the temperature of the reaction should be over 200° C. for best results.

The time of reaction may vary widely, ranging from about 1/3 to about 5 hours or more; preferably the reactants are agitated for between about 1 and about 3 hours. Control of the time of reaction of the sulphonated material with amines is important from the standpoint of effecting the production of products having softening properties for textile materials. Thus, for example, we have found that one of the most effective softeners obtainable in accordance with our invention is produced by reacting substantially anhydrous and salt-free sulphonated oleic acid with monoethanolamine at a temperature of about 150° C. for about 1 hour, whereby a product is obtained comprising approximately equal proportions of the sulphonated oleic monoethanolamide and the sulphonated oleic monoethanolamine soap. We have found that generally the most effective textile softeners are obtained by carrying out the reaction of the sulphonated material and the amine for a time and at a temperature such that a considerable amount of amine soap remains in the final product.

The following examples are illustrative of our invention. Amounts are given in parts by weight.

*Example I*

380 parts of sulphonated oleic acid containing 1.3% water and 0.05% inorganic salts and 61 parts of monoethanolamine were heated in an open vessel with constant agitation at a temperature of about 150° C. for about 50 minutes. The product was a solid soluble in water and dilute alkali, containing not more than 1.3% water and 0.05% inorganic salts, and comprised a mixture of approximately equal proportions of the monoethanolamide of sulphonated oleic acid and the monoethanolamine soap of sulphonated oleic acid. The pH value of a 5% solution of this mixture was about 7.5.

*Example II*

200 parts of sulphonated oleic acid containing 1.3% water and 0.05% inorganic salts were mixed with 20 parts of monoethanolamine and the mixture refluxed at a temperature slightly below 160° C. for about 2 hours. The product was a solid soluble in water and dilute alkali, containing not more than 1.3% water and 0.05% inorganic salts, and comprised a mixture containing a predominant amount of the monoethanolamide of sulphoriated oleic acid and a minor amount of the monoethanolamine soap of sulphonated oleic acid.

*Example III*

380 parts of sulphonated oleic acid containing 1.3% water and 0.05% inorganic salts and 150 parts of triethanolamine were heated in an open vessel with constant agitation at a temperature of about 150° C. for 1 hour. The product was a solid soluble in water and dilute alkali, containing not more than 1.3% water and 0.05% inorganic salts, and comprised chiefly the triethanolamine soap of sulphonated oleic acid.

*Example IV*

200 parts of sulphonated oleic acid containing 1.3% water and 0.05% inorganic salts and 31 parts of morpholine were heated in an open vessel with constant agitation at a temperature of between 100° and 105° C. for 3 hours. The product was soluble in water and contained not more than 1.3% water and 0.05% inorganic salts.

*Example V*

200 parts of sulphonated oleic acid containing 1.3% water and 0.05% inorganic salts and 35 parts of diethylene triamine were heated with constant agitation at a temperature of 150° C. for 3½ hours. The product was a solid soluble in water and contained not more than 1.3% water and 0.05% inorganic salts.

*Example VI*

200 parts of sulphonated oleic acid containing 1.3% water and 0.05% inorganic salts and 50 parts of triethylene tetramine were heated with constant agitation at a temperature of 150° C. for 3½ hours. The product was a solid soluble in water and contained not more than 1.3% water and 0.05% inorganic salts.

*Example VII*

380 parts of sulphonated oleic acid containing 1.3% water and 0.05% inorganic salts and 104 parts of hydroxyethyl ethylene diamine were heated with constant agitation at a temperature of 150° C. for 3 hours. The product was soluble in water and contained not more than 1.3% water and 0.05% inorganic salts.

*Example VIII*

250 parts of sulphonated oleic acid containing 1.3% water and 0.05% inorganic salts and 39 parts of aniline were heated with constant agitation at about 150° C. for 1½ hours. The product was insoluble in water and contained not more than 1.3% water and 0.05% inorganic salts.

*Example IX*

250 parts of sulphonated oleic acid containing 1.3% water and 0.05% inorganic salts and 153 parts of octadecylamine were heated with constant agitation at a temperature of 150° C. for 1 hour. The product was a solid insoluble in water and contained not more than 1.3% water and 0.05% inorganic salts.

*Example X*

150 parts of sulphonated sperm oil containing less than 2% water and only a trace of inorganic salts and 21 parts of monoethanolamine were heated with constant agitation at a temperature of about 150° C. for about 1 hour. The product was soluble in water and contained less than 2% water and only a trace of inorganic salts.

*Example XI*

200 parts of sulphonated castor oil containing less than 2% water and only a trace of inorganic salts and 36.5 parts of ethylene diamine were heated with constant agitation at a temperature of 125° C. for 7 hours. The product was soluble in water and contained less than 2% water and only a trace of inorganic salts.

*Example XII*

200 parts of sulphonated oleic acid containing 1.3% water and 0.05% inorganic salts, 25 parts of monoethanolamine, and 61 parts of triethanolamine were heated with constant agitation at a temperature of 150° C. for 1½ hours. The product was a solid soluble in water and contained not more than 1.3% water and 0.05% inorganic salts.

*Example XIII*

200 parts of sulphonated oleic acid containing 1.3% water and 0.05% inorganic salts and 24 parts of acetamide were heated with constant agitation at a temperature of about 150° C. for about 20 minutes. The product was soluble in water and contained not more than 1.3% water and 0.05% inorganic salts.

*Example XIV*

200 parts of the sulphonated isobutyl ester of sperm oil containing less than 2% water and only a trace of inorganic salts and 20 parts of ethylene diamine were refluxed for 8 hours. The product was insoluble in water and contained less than 2% water and only a trace of inorganic salts.

*Example XV*

200 parts of sulphonated oleic acid containing 1.3% water and 0.05% inorganic salts and having an $SO_3$ content of about 13% and 27 parts of urea were heated with constant agitation for 45 minutes at a temperature of 150° C. The product was soluble in water and contained not more than 1.3% water and 0.05% inorganic salts.

*Example XVI*

200 parts of sulphonated oleic acid containing 1.3% water and 0.05% inorganic salts and having an $SO_3$ content of about 13% and 88 parts of lauryl amine were reacted for about 30 minutes at a temperature of 150° C. The product was insoluble in water and contained not more than 1.3% water and 0.05% inorganic salts.

The products obtained in the practice of the above examples were all found to be excellent softeners for textile materials; these products may be applied to textiles such as rayon, silk, cotton, etc. by any of the well known methods, e. g., in the form of a dilute solution thereof, and in every case we have found that the treated textile material possesses a better hand, a softer feel, a slicker surface, a better drape, and a greater pliability than textiles treated with softeners prepared by reacting amines or amides with corresponding sulphonated oils, fats, fatty acids or fatty esters containing the usual amounts of water and inorganic salts. Thus it is evident the products of our invention constitute an important advance in the art of softening textiles and will find extensive use in this connection.

In addition to their use as textile softeners, the products prepared in accordance with our invention may be employed as wetting, dispersing and emulsifying agents, plasticizers, detergents, pour point depressors in fuels and lubricants, penetrating agents in leather and paper treating, de-emulsifying agents for crude oil emulsions, blending and dewaxing agents in petroleum refining, defoamers, latex stabilizers, and treating agents for wool and other cellulosic products; they may be incorporated in adhesive compositions, cosmetics, compositions for fatliquoring or oiling leather, lubricants, cutting oils, wire drawing compounds, and polishes; they may be employed for removing spray residue, for treating textiles, and may be added to viscose spinning baths to prevent clogging of the spinnerets. Because of their negligible water content, they may be compounded with oils or other substances to produce a wide variety of compositions suitable for industrial use; furthermore, since the products of our invention contain substantially no inorganic salts, emulsions containing these products are not rendered unstable thereby and may be used as desired without detrimentally affecting the quality of the material being treated. The products of our invention may stand for prolonged periods of time without appreciable hydrolysis or oxidation. In view of the unique properties of our new products, it is evident they may be advantageously adapted to a wide variety of uses.

It is to be understood that the term "sulphonated" is used throughout the specification and claims to denote substances containing either the true sulphonic group or a sulphate group; this term is also intended to include products of the type disclosed in which the sulphonate group is either neutralized or unneutralized. This usage of the term "sulphonate" is in accordance with the generally accepted manner in which this term is employed in the art.

Since certain changes may be made in the above products and different embodiments of the invention could be made without departing from the scope thereof, it is intended that all matter contained in the above description shall be interpreted as illustrative and not in a limiting sense.

Having described our invention, what we claim as new and desire to secure by Letters Patent is:

1. The reaction product of a compound selected from the group consisting of organic amines and amides with a substance selected from the group consisting of sulphonated oils, fats, higher fatty acids and higher fatty acid esters containing not more than about 3% water and not more than about 0.2% inorganic salts.

2. The amido reaction product of an aliphatic amine with a substance selected from the group consisting of sulphonated oils, fats, higher fatty acids and higher fatty acid esters containing not more than about 3% water and not more than about 0.2% inorganic salts.

3. The amido reaction product of an aliphatic alkylolamine with a substance selected from the group consisting of sulphonated oils, fats, higher fatty acids and higher fatty acid esters containing not more than about 3% water and not more than about 0.2% inorganic salts.

4. The amido reaction product of an aliphatic polyamine with a substance selected from the group consisting of sulphonated oils, fats, higher fatty acids and higher fatty acid esters containing not more than about 3% water and not more than about 0.2% inorganic salts.

5. The amido reaction product of mono-ethanolamine with a substance selected from the group consisting of sulphonated oils, fats, higher fatty acids and higher fatty acid esters containing not more than about 3% water and not more than about 0.2% inorganic salts.

6. The amido reaction product of hydroxy ethyl ethylene diamine with a substance selected from the group consisting of sulphonated oils, fats, higher fatty acids and higher fatty acid esters containing not more than about 3% water and not more than about 0.2% inorganic salts.

7. The amido reaction product of diethylene triamine with a substance selected from the group consisting of sulphonated oils, fats, higher fatty acids and higher fatty acid esters containing not more than about 3% water and not more than about 0.2% inorganic salts.

8. The amido reaction product of mono-ethanolamine and sulphonated oleic acid containing not more than 3% water and not more than 0.2% inorganic salts.

9. The amido reaction product of hydroxy ethyl ethylene diamine and sulphonated oleic acid containing not more than 3% water and not more than 0.2% inorganic salts.

10. The amido reaction product of diethylene triamine and sulphonated oleic acid containing not more than 3% water and not more than 0.2% inorganic salts.

EDWIN A. ROBINSON.
THOMAS G. WEBBER, Jr.